(12) United States Patent
Wiley et al.

(10) Patent No.: US 11,772,279 B2
(45) Date of Patent: Oct. 3, 2023

(54) PRODUCT STACKING END OF ARM TOOL

(71) Applicant: House of Design LLC, Nampa, ID (US)

(72) Inventors: Patrick J. Wiley, Boise, ID (US); Chris Scot Annin, Emmett, ID (US)

(73) Assignee: House of Design LLC, Nampa, ID (US)

( * ) Notice: Subject to any disclaimer, the term of this patent is extended or adjusted under 35 U.S.C. 154(b) by 267 days.

(21) Appl. No.: 17/233,315

(22) Filed: Apr. 16, 2021

(65) Prior Publication Data

US 2022/0331991 A1 Oct. 20, 2022

(51) Int. Cl.
*B25J 15/02* (2006.01)
*B25J 15/00* (2006.01)

(52) U.S. Cl.
CPC ......... *B25J 15/022* (2013.01); *B25J 15/0033* (2013.01)

(58) Field of Classification Search
CPC ..... B25J 15/022; B25J 15/0033; B25J 15/024
See application file for complete search history.

(56) References Cited

U.S. PATENT DOCUMENTS

| | | | | |
|---|---|---|---|---|
| 5,024,575 A * | 6/1991 | Anderson | ............... | B65G 47/90 414/737 |
| 7,481,472 B2 * | 1/2009 | Cawley | ................... | B65G 61/00 294/907 |
| 7,717,255 B2 * | 5/2010 | Scott | ...................... | B25J 9/0093 414/744.1 |
| 8,414,042 B2 * | 4/2013 | Landes | ................... | B65G 47/90 294/67.31 |
| 8,857,877 B2 * | 10/2014 | Lin | ...................... | B25J 15/0052 901/14 |

* cited by examiner

*Primary Examiner* — Stephen A Vu
(74) *Attorney, Agent, or Firm* — Foley & Lardner LLP

(57) ABSTRACT

Systems and methods used to pick and stack product for transport are disclosed. The systems and methods include a robotic end of arm stacking tool coupled to a robotic arm and including a product support. The product support includes fingers that pivot about an axis to allow spatulas coupled to the fingers to slide under and support the product when the product is picked from a product orienting member and stacked in a product transport member. An actuator can be activated to maintain the product support in a product support state and deactivated to release the product into the product transport member.

25 Claims, 10 Drawing Sheets

PRODUCT STACKING END OF ARM TOOL

TECHNICAL FIELD

The present disclosure relates generally to the field of product packaging, and more particularly to tools, systems, and methods for stacking product into containers for shipment.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
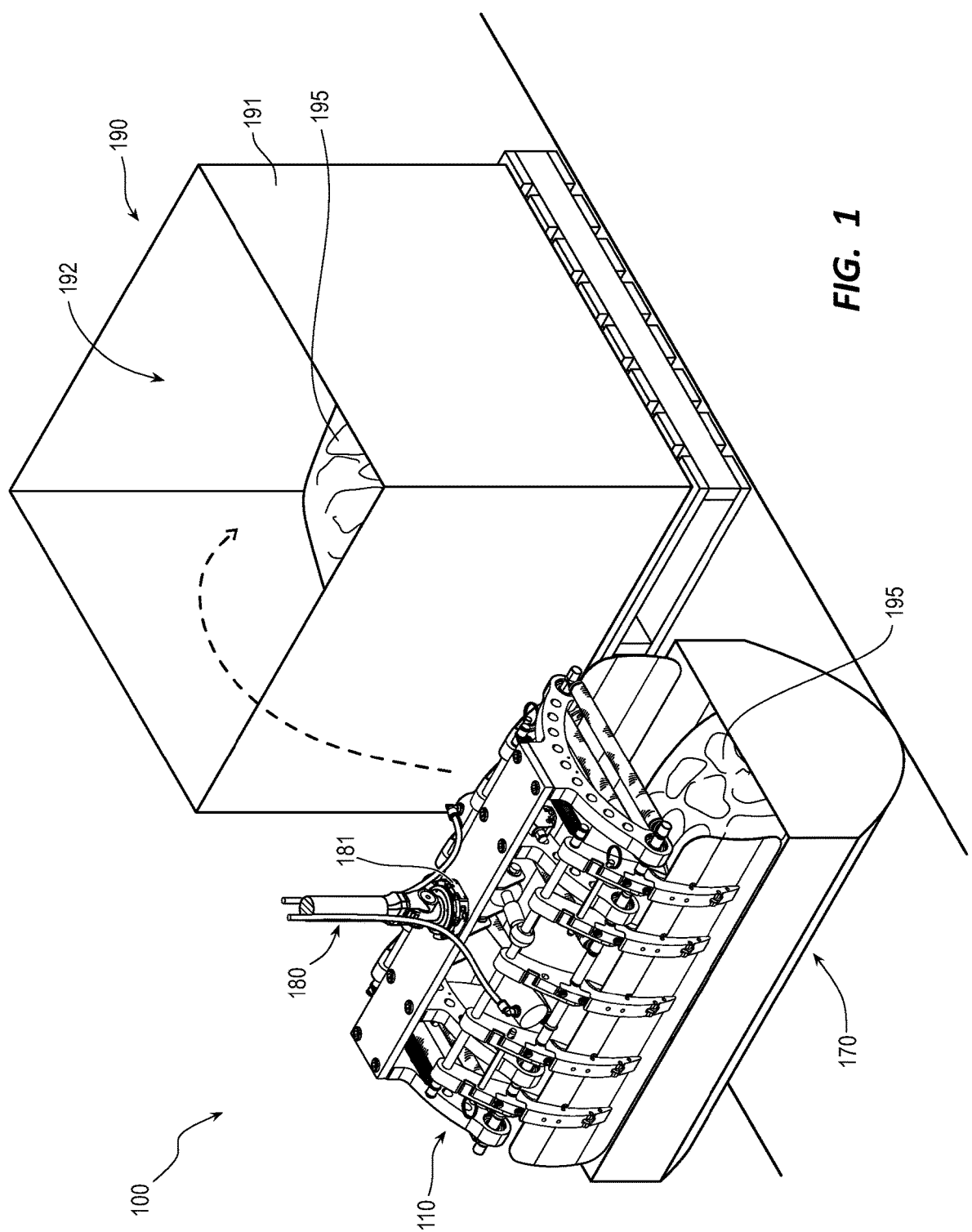
FIG. 1 is a perspective view of a product stacking system, according to one embodiment of the present disclosure.

Automating product packaging can provide significant labor and economic benefits as it increases the efficiency of a system. Often products are not sold individually. Rather, a plurality of similar products are placed in a bag to be sold. The embodiments disclosed herein are described with reference to a bag. As can be appreciated, the disclosed embodiments may operate with other types of packages as well, and the term bag in the present disclosure is representative of any suitable or appropriate type of packaging. Additionally, these bags are often stacked onto pallets or into bins for shipping. Stacking into these bins is often done manually. To increase efficiency, a robotic arm may be used to stack the bags in the bins.

Described herein are embodiments of a product stacking tool, system, and method that utilizes automation to pick product from a product orienting member and stack product into or onto a product transport member, such as a bin or pallet. Described herein are embodiments of a product stacking system that includes a robotic arm, a robotic end of arm tool or stacking tool, a product orienting member, and a product transport member. In some embodiments within the scope of this disclosure, the stacking tool includes a frame, a product support that includes fingers and spatulas or paddles coupled to the fingers, and actuators that hold the product support in a product supporting state. The fingers can pivot inwardly about an axis aligned with a longitudinal axis of the frame to allow the paddles to slide under the product. The product orienting member can orient the product relative to the stacking tool, and the product transport member can receive the product to be transported to a desired location.

Described herein are embodiments of a method of stacking a product. For example, the method can include the steps of orienting the product within a product orienting member to align the product, moving a robotic end of arm stacking tool into the product orienting member to engage the fingers with a wall of the product orienting member, pivoting the fingers about an axis to displace the fingers inwardly, sliding spatulas coupled to the fingers under the product, activating actuators to apply an outwardly directed force to the fingers to support the product, moving the robotic end of arm stacking tool out of the product orienting member, and lifting the product with the spatulas.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

Figure 2A:
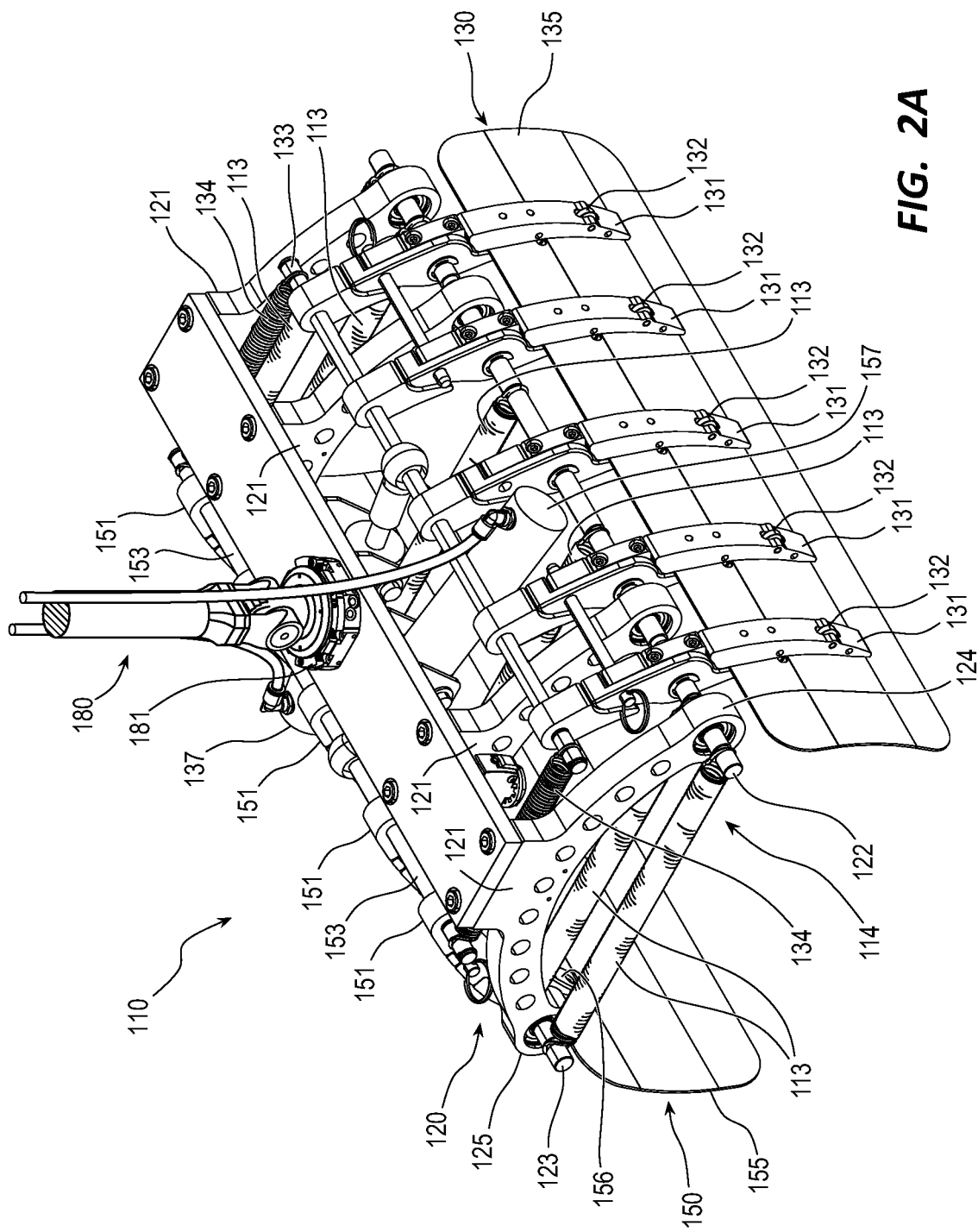
FIG. 2A is a top perspective view of an embodiment of a product stacking tool of the product stacking system of FIG. 1.
Figure 2B:
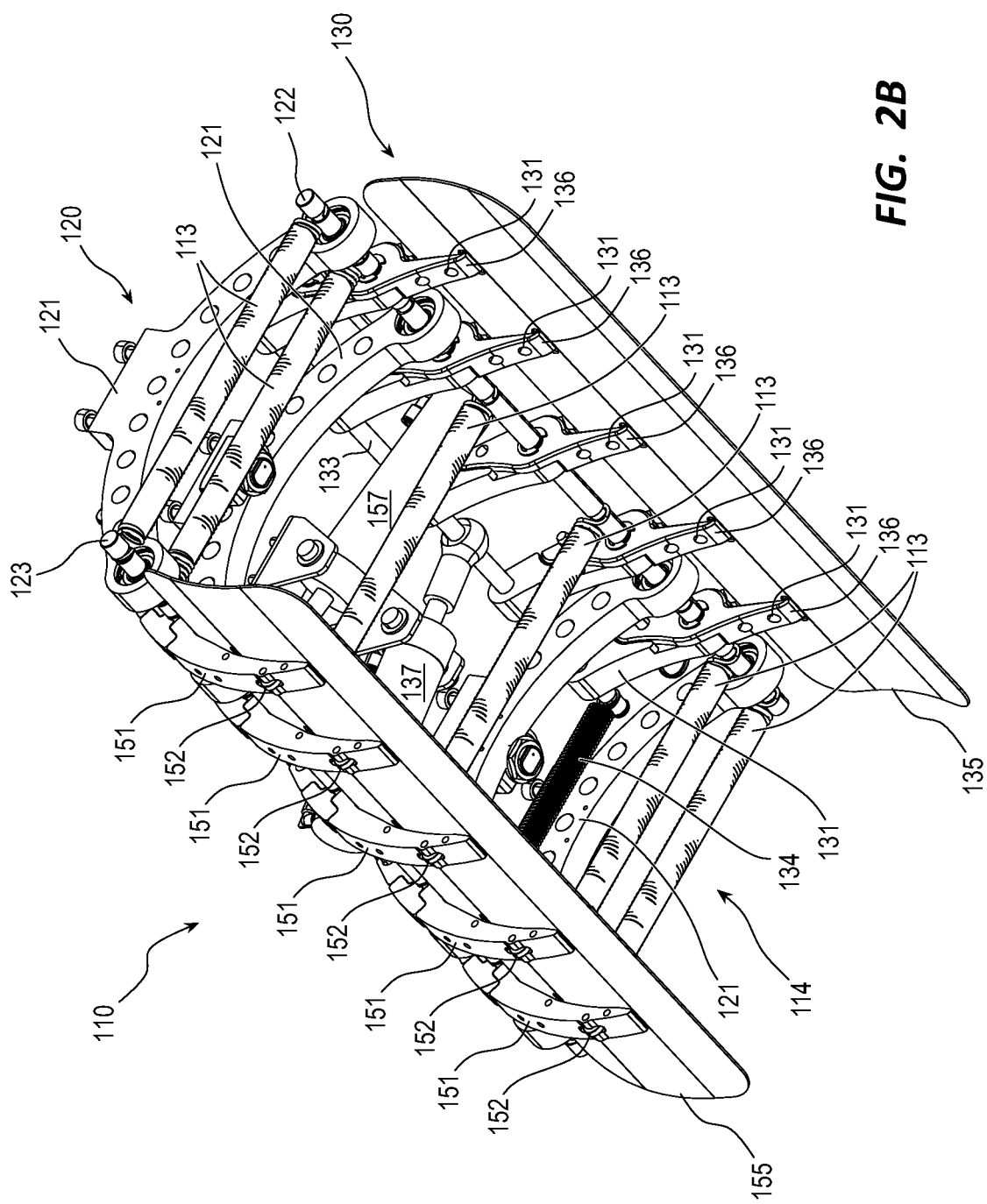
FIG. 2B is a bottom perspective view of the product stacking tool of the product stacking system of FIG. 1.
Figure 2C:
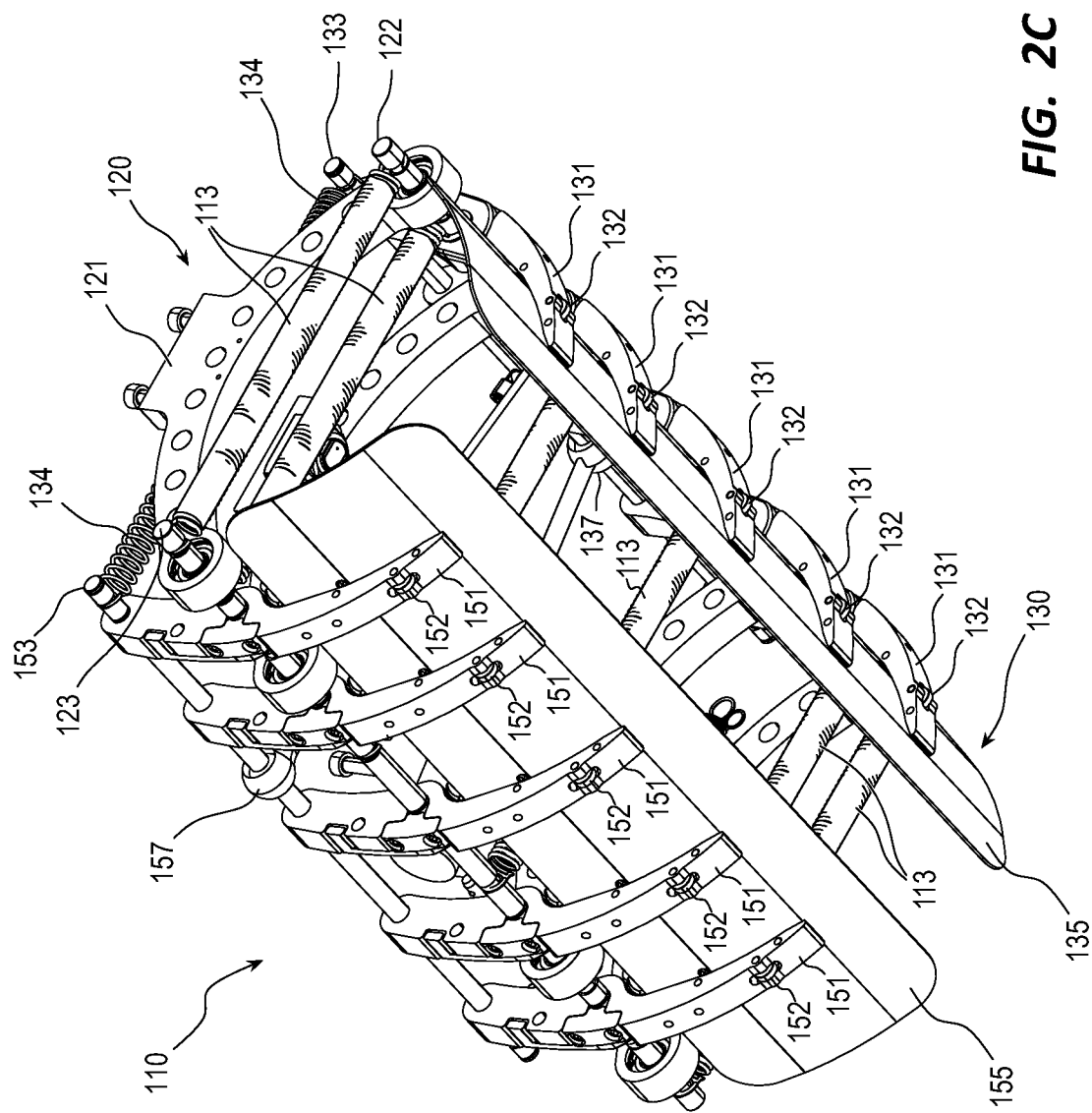
FIG. 2C is a bottom perspective view of the product stacking tool of the product stacking system of FIG. 1 in a product support state.
Figure 3:
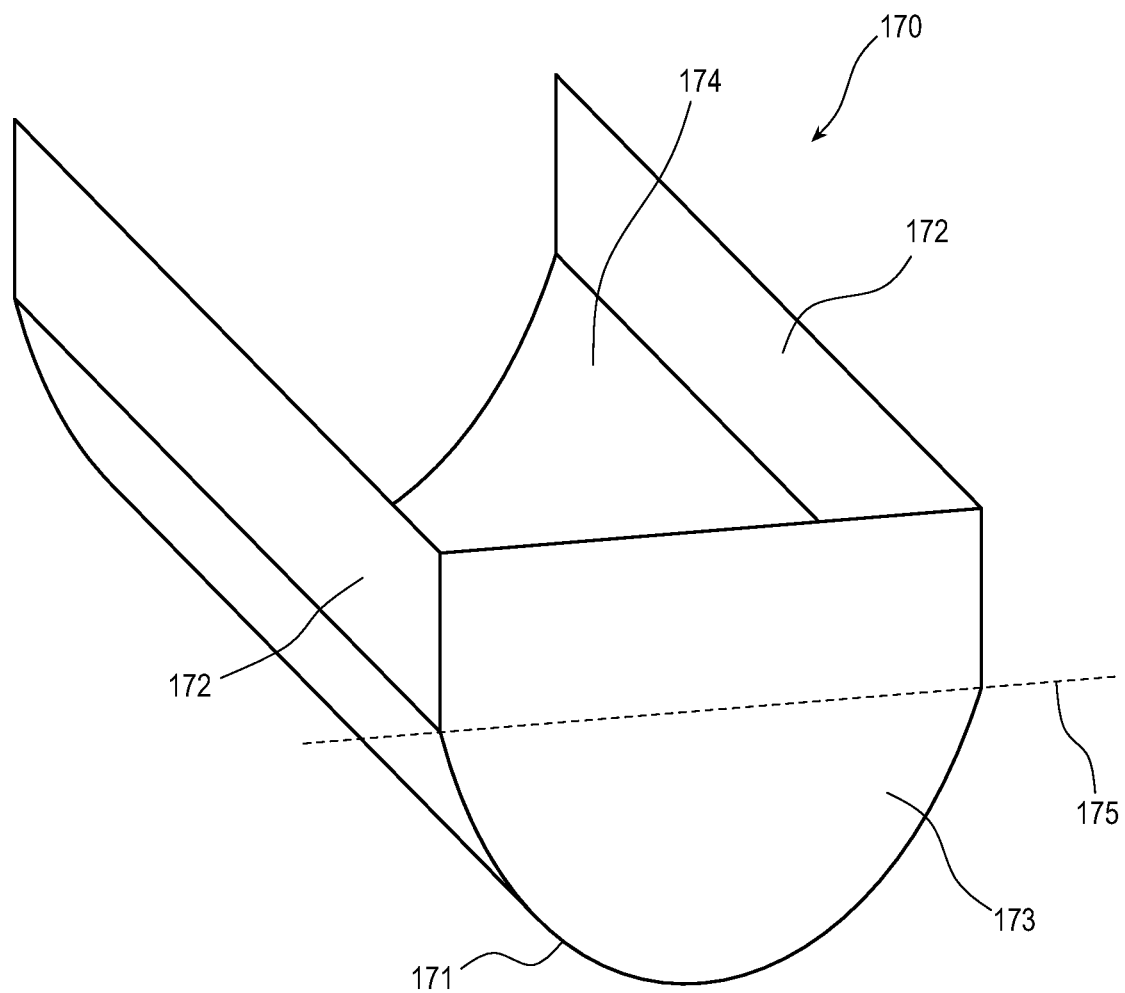
FIG. 3 is a perspective view of an embodiment of a product orienting member of the product stacking system of FIG. 1.

FIG. 1 illustrates an embodiment of a product stacking system 100. FIGS. 2A-2C illustrate an embodiment of a product stacking tool 110 of the product stacking system 100. FIG. 3 illustrates an embodiment of a product orienting member 170 of the product stacking system 100. FIGS. 4A-4E illustrate a method of stacking a product utilizing the product stacking system 100. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

FIG. 1 illustrates a product stacking system 100, according to one embodiment of the present disclosure. As illustrated in FIG. 1, the product stacking system 100 includes four broad groups of components; each group may have numerous subcomponents and parts. The four broad component groups are: a robotic end of arm tool or product stacking tool 110, a product orienting member 170, a robotic arm 180, and a product transport member 190. The product stacking system 100 can be configured to pick and stack product into or onto the product transport member 190 utilizing robotic automation. A product 195 can include any type of substance suitable for bulk packaging in bags. For example, the product 195 can be a bag of potatoes, apples, pears, oranges, lemons, carrots, onions, flour, sugar, seeds, etc. A weight of the product 195 can range from about 5 pounds to about 50 pounds.

The robotic arm 180 may be an appropriate robotic system to move the product stacking tool 110 from a product loading position to a product unloading position. The robotic arm 180 can include a connector plate 181 configured to couple the robotic arm 180 to the product stacking tool 110. In some embodiments, the robotic arm 180 may comprise a six-axis robotic arm, which can position the product stacking tool 110 in three axes of space (Cartesian coordinates x, y, z) and orient the object in three axes of orientation (yaw, pitch and roll). As can be appreciated, the robotic arm 180 may comprise fewer axes of movement.

In some embodiments, the robotic arm 180 may include a turntable configured to support the product transport member 190, which thereby provides the robotic arm 180 an additional axis of movement. Stated differently, the turntable may be a part of or otherwise controlled by a controller of the robotic arm 180, such that the robotic arm 180 includes an additional axis of movement beyond what might otherwise be available. Accordingly, if the robotic arm 180 were, for example, a five-axis robot without the turntable, then a sixth axis of movement is provided by the ability of the robotic arm 180 to manipulate the turntable. Similarly, as another example, a typical six-axis robotic arm 180 would have a seventh axis of movement through manipulation of the turntable. The product transport member 190 can be disposed on the turntable to rotate the product transport member 190 relative to the robotic arm 180.

In the illustrated embodiment, the product transport member 190 can be a bin, box, or crate having side walls 191 that define an interior space or volume 192 into which the product stacking tool 110 may be disposed to stack the product 195. In other embodiments, the product transport member 190 can be an open pallet. The product transport member 190 can be formed of any suitable material, such as cardboard, pressed board, plastic, or metal. Other materials are contemplated.

FIGS. 2A-2C illustrate an embodiment of the robotic end of arm tool or stacking tool 110. The stacking tool 110 is configured to pick the product 195 from the product orienting member 170, support the product 195 while the stacking tool 110 is moved to the product transport member 190, and stack the product 195 into or onto the product transport member 190, as will be described below. In certain embodiments, the product stacking system 100 may include two or more product stacking tools 110 aligned side by side. As illustrated, the stacking tool 110 includes a frame 120 and a product support 130. The frame 120 is couplable to the robotic arm 180. The frame 120 includes cross bars 121 disposed along a length of the frame 120. The number of cross bars 121 may be two, three, four, or more. The cross bars 121 may have an arcuate concave shape defining a product holding space 114. A first pivot rod 122 is disposed through first ends 124 of the cross bars 121 and a second pivot rod 123 is disposed through second ends 125, opposite of the first ends 124, of the cross bars 121. The first and second pivot rods 122, 123 are oriented horizontally relative to the frame 120 and parallel to each other. The first and second pivot rods 122, 123 are rotatable relative to the cross bars 121. In some embodiments, bearings disposed in the first and second ends 124, 125 may facilitate rotation or the first and second pivot rods 122, 123.

The product support 130 includes fingers 131, 151, push rods 133, 153, spatulas or paddles 135, 155, and actuators 137, 157. The fingers 131, 151 have an arcuate shape. The number of fingers 131, 151 can be one, two, three, four, five, or more. The fingers 131 can be selectively coupled to the first pivot rod 122 at a longitudinal midpoint of the fingers 131 such that the fingers 131 can pivot about a longitudinal axis of the pivot rod 122. In other words, the longitudinal axis of the first pivot rod 122 is in alignment with a pivot axis of the product support 130. The fingers 151 can be selectively coupled to the second pivot rod 123 at a longitudinal midpoint of the fingers 151, such that the fingers 151 can pivot about a longitudinal axis of the second pivot rod 123. The fingers 131, 151 can pivot about the longitudinal axes of the first and second pivot rods 122, 123 from a pre-load state, wherein the fingers 131, 151 have a substantially vertical orientation as shown in FIGS. 2A and 2B, to a product support state, as shown in FIG. 2C, wherein the fingers 131, 151 have an angled orientation. The angle of the fingers 131, 151 in the product support state can range from about 90 degrees to about 160 degrees relative to a vertical plane extending through the product stacking tool 110.

The spatulas 135, 155 are coupled to distal portions of the fingers 131, 151. Guide members 132, 152 are coupled to an outward facing side of the distal portion of the fingers 131, 151 to engage with the product orienting member 170 when the product support 130 is disposed into the product orienting member 170. The guide members 132, 152 may include a wheel, a roller, a skid, bushing, glide, slide, slope, and skate. Other types of guide members are contemplated. The fingers 131, 151 include tongue portions 136 extending downward from the midpoint and configured to interface with an inner surface of the spatulas 135, 155, wherein an end of the tongue portions 136, 156 is disposed within a slot of the spatulas 135, 155 to prevent the tongue portions 136, 156 from catching and damaging the product 195.

The push rod 133 is coupled to upper ends of the fingers 131 and is oriented parallel to the first pivot rod 122. The actuator 137 is supported by the frame 120 and coupled to the push rod 133. The actuator 137 can apply an outwardly directed force to the upper ends of the fingers 131 via the push rod 133 to hold the product support 130 in a product support state, as shown in FIG. 2C. The push rod 153 is coupled to upper ends of the fingers 151 and is oriented parallel to the second pivot rod 123. The actuator 157 is supported by the frame 120 and coupled to the push rod 153. The actuator 157 can apply an outwardly directed force to the upper ends of the fingers 151 via the push rod 153 to hold the product support 130 in the product support state, as shown in FIG. 2C. In the illustrated embodiment, the actuators 137, 157 include a pneumatic linear actuator. In other embodiments, the actuators 137, 157 can be any suitable type of linear displacement actuator, such as an electromagnetic solenoid, a hydraulic linear actuator, a stepper motor, and a servomotor. Other types of linear displacement actuators are contemplated within the scope of this disclosure.

The spatula 135 is coupled to the distal portions of the fingers 131, wherein the spatula 135 extends downward from and distal to the fingers 131 in a vertical orientation when the product support 130 is in a pre-load state and extends along the length of the frame 120, as shown in FIGS. 2A and 2B. The spatula 155 is coupled to the distal portions of the fingers 151, wherein the spatula 155 extends downward from and distal to the fingers 151 in a vertical orientation when the product support 130 is in the pre-load state and extends along the length of the frame 120, as shown in FIGS. 2A and 2B. In the illustrated embodiment, the spatulas 135, 155 include a rectangular shape. In other embodiments, the spatulas 135, 155 may include any suitable shape for supporting the product 195. For example, the spatulas 135, 155 may include a half elliptical shape, a triangular shape, or a trapezoidal shape. Other shapes are contemplated. The spatulas 135, 155 may be formed from any suitable material, such as polyoxymethylene homopolymer, polyethylene, stainless steel, or aluminum. Other materials are contemplated.

As illustrated in FIGS. 2A and 2B, finger retraction members 134 are coupled to and extend between the push rods 133, 153. The retraction members 134 can apply an inwardly directed force to the upper ends of the fingers 131, 151 via the push rods 133, 153 to displace the upper ends of the fingers 131, 151 inwardly and the spatulas 135, 155 outwardly when the actuators 137, 157 are deactivated. The number of retraction members 134 can be one, two, three, four, or more. The retraction members 134 may be disposed adjacent ends of the push rods 133, 153 or anywhere along a length of push rods 133, 153. In the illustrated embodiment, the retraction members 134 include a coiled tension spring. In other embodiments, the retraction members 134 may include any suitable type of resilient member, such as an elastomeric band, an elastomeric chord, extension spring, etc. In another embodiment, the retraction members 134 can include a gas cylinder.

As shown in FIGS. 2A and 2B, product retention members 113 are coupled to and extend between the first and second pivot rods 122, 123. The product retention members 113 are disposed within the product holding space 114 and can apply a downward force to the product 195 such that the product 195 is pressed against the spatulas 135, 155. The number of product retention members 113 can be one, two, three, four, or more. The product retention members 113 may be disposed anywhere along a length of pivot rods 122, 123. In the illustrated embodiment, the product retention members 113 include a coiled tension spring. In other embodiments, the product retention members 113 may include any suitable type of resilient member, such as a covered extension spring, an elastomeric band, an elastomeric chord, etc.

FIG. 3 illustrates the product orienting member 170. As illustrated in FIG. 3, the product orienting member 170 includes an elongate arcuate wall 171 defining a trough 174 configured to receive and orient the product 195. A horizon 175 extending from one side of the arcuate wall 171 to an opposite side of the arcuate wall 171 is less than 180 degrees. In other words, a cross-section of the arcuate wall 171 forms less than one half a circle. The arcuate shape of the fingers 131, 151 of the stacking tool 110 can correspond with a contour of the arcuate wall 171. Vertical walls 172 extend upward from sides of the arcuate wall 171. A distance between the vertical walls 172 may vary to accommodate product sizes ranging from small to large. For example, the distance may range from about six inches to about 50 inches. An endplate 173 is coupled to a closed end of the product orienting member 170 to retain the product 195 within the product orienting member 170 and an opposite end may be open to receive the product 195. The product orienting member 170 may be formed of any suitable material, such as stainless steel, aluminum, or polycarbonate. Other materials are contemplated. The product orienting member 170 may be oriented at a decline toward the closed end such that the product enters the product orienting member 170 at the open end and slides to the closed end due to gravity.

Figure 4A:
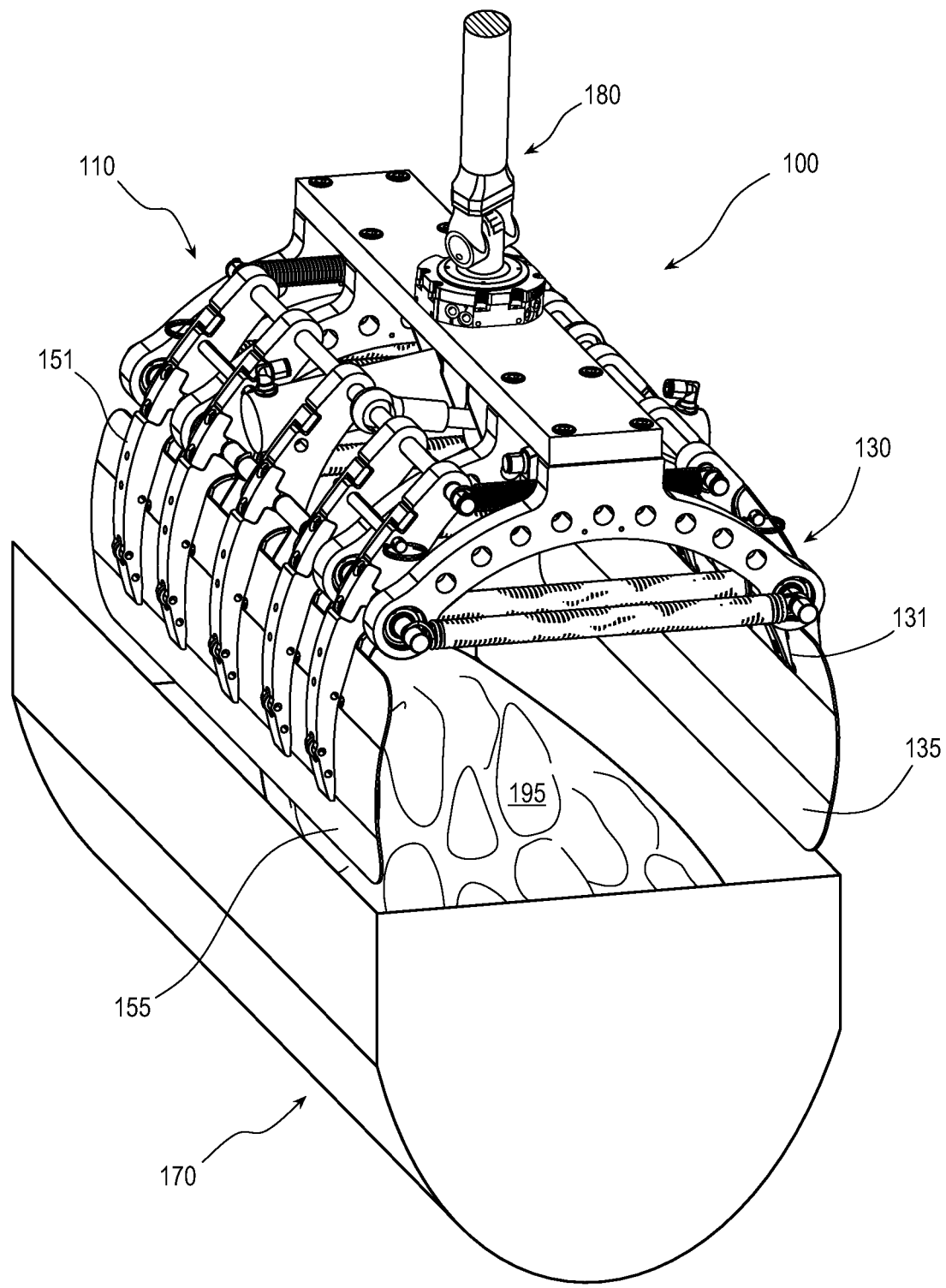
FIG. 4A is a perspective view of the product stacking tool of FIG. 1 in a pre-load position.

FIGS. 4A-4E illustrate the product stacking system 100 in use. As illustrated in FIG. 4A, the robotic arm 180 can position the product stacking tool 110 over the product orienting member 170 in a pre-load position, such that a longitudinal axis of the product stacking tool 110 is aligned with a longitudinal axis of the product orienting member 170. In the pre-load position, the fingers 131, 151 of the product support 130 are oriented vertically in the pre-load state, wherein the spatulas 135, 155 are oriented vertically. The product 195 is disposed within the product orienting member 170, such that a longitudinal axis of the product 195 is aligned with the longitudinal axis of the product stacking tool 110.

Figure 4B:
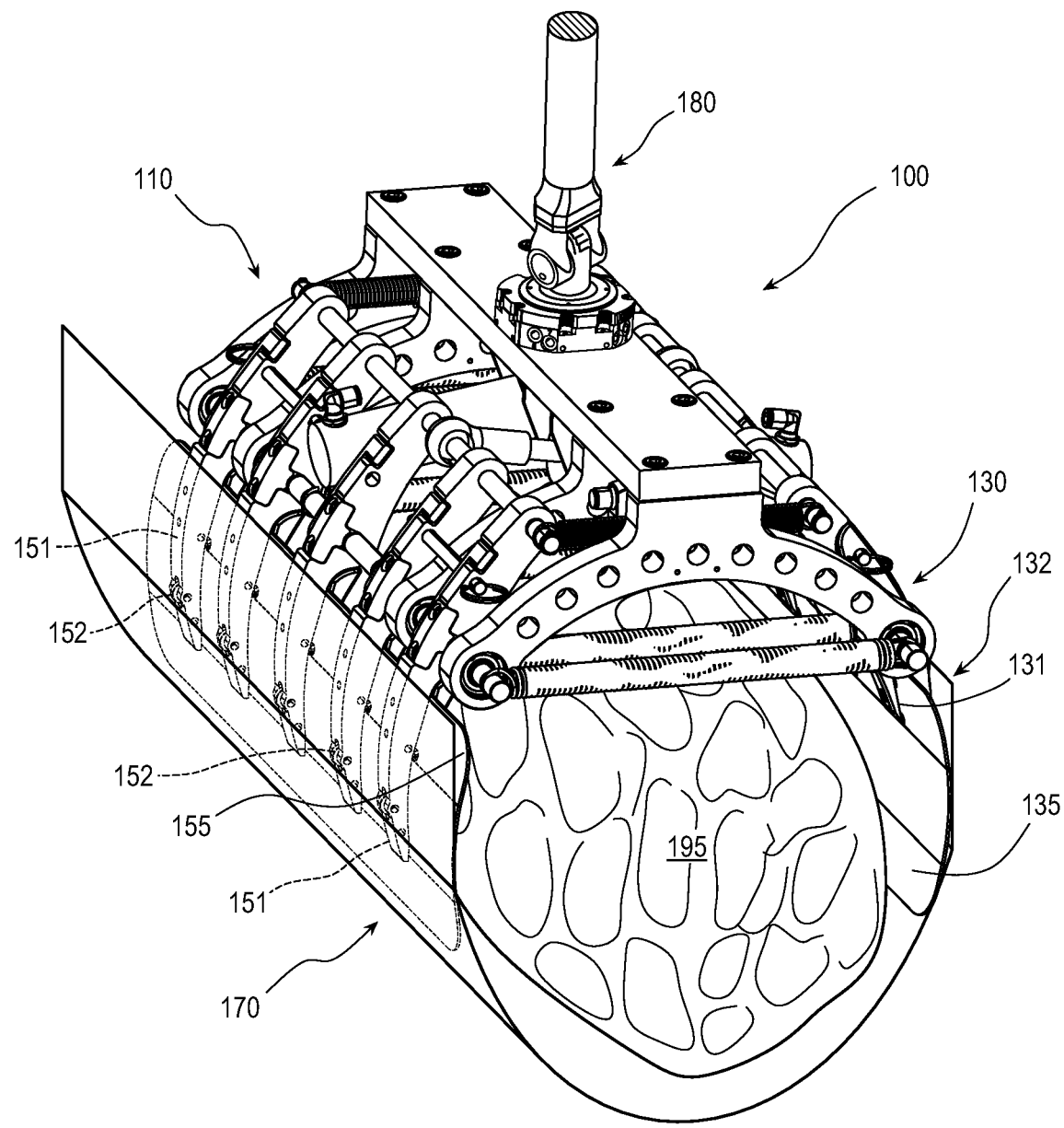
FIG. 4B is a perspective view of the product stacking tool of FIG. 1 partially disposed into the product orienting member of FIG. 1

As illustrated in FIG. 4B, the robotic arm 180 can displace the product stacking tool 110 downwardly. When displaced downwardly, the product support 130 is moved into the product orienting member 170 (shown without endplate 173) such that the spatulas 135, 155 are disposed within the product orienting member 170 and the product 195 is disposed between the spatulas 135, 155. The guide members 132, 152 of the fingers 131, 151 can engage with the vertical walls 172 of the product orienting member 170.

Figure 4C:
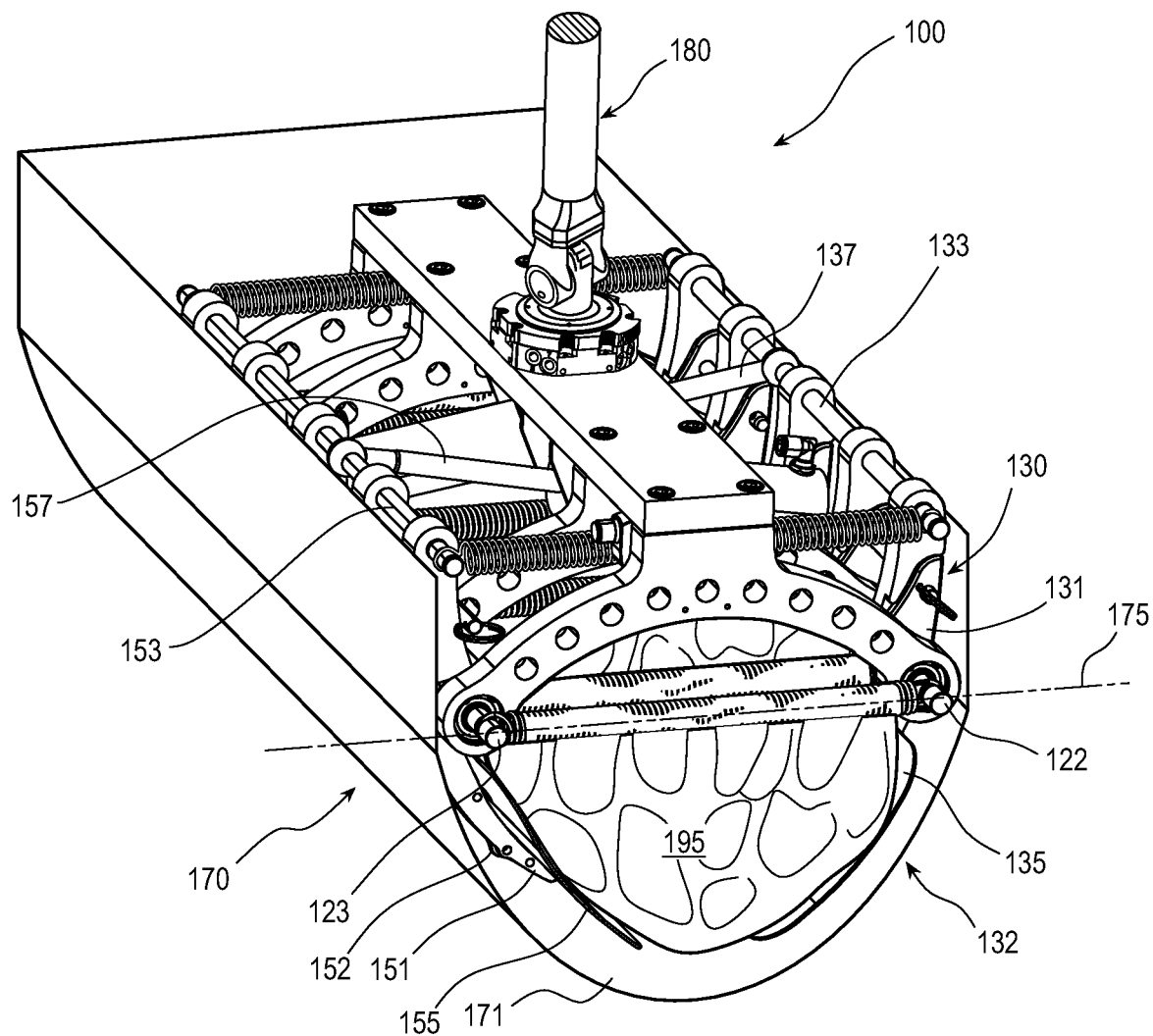
FIG. 4C is a perspective view of the product stacking tool of FIG. 1 disposed into the product orienting member of FIG. 1 and in a product support state.

As illustrated in FIG. 4C, the robotic arm 180 can further displace the product stacking tool 110 downwardly into the product orienting member 170 (shown without endplate 173). The guide members 132, 152 engage the arcuate wall 171 to rotate the fingers 131, 151 inwardly about the first and second pivot rods 122, 123 as the guide members 132, 152 follow a contour of the arcuate wall 171. The fingers 131, 151 transition from the vertical orientation to an angled orientation where the distal ends of the fingers 131, 151 are directed toward a midplane of the product stacking tool 110. The spatulas 135, 155 are displaced inwardly toward each other as they slide under the product 195 in the product support state. The actuators 137, 157 are activated to apply an outward force to the fingers 131, 151 via the push rods 133, 153 to maintain the spatulas 135, 155 in the angled orientation underneath the product 195. The first and second pivot rods 122, 123 may be in alignment with the horizon 175 of the arcuate wall 171. In another embodiment, the actuators 137, 157 may apply the outward force to the fingers 131,151 while the product stacking tool 110 is further displaced into the product orienting member 170 causing the spatulas 135, 155 to be displaced inwardly to the product support state.

Figure 4D:
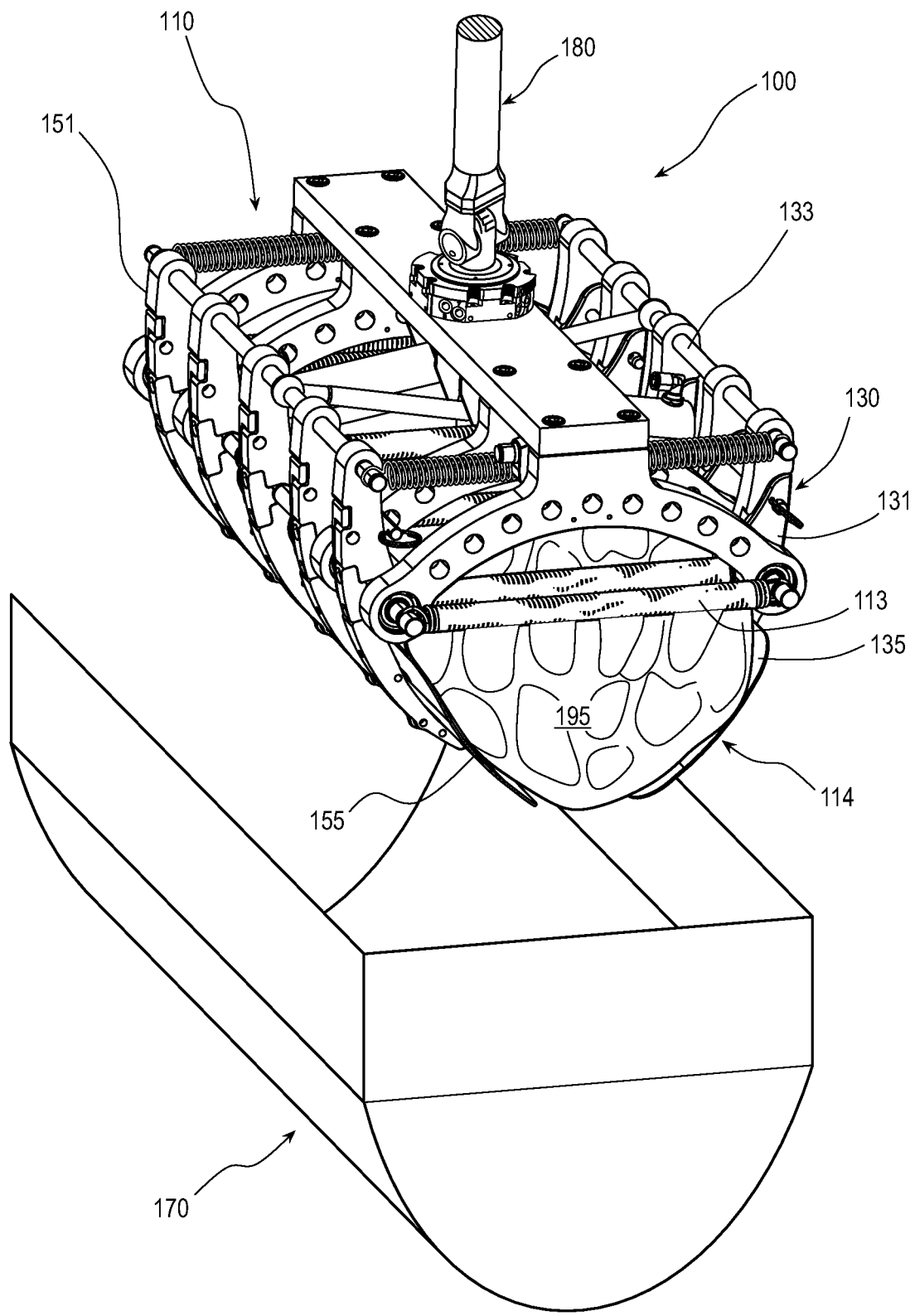
FIG. 4D is a perspective view of the product stacking tool of FIG. 1 and a product displaced from the product orienting member of FIG. 1.

As illustrated in FIG. 4D, the robotic arm 180 can displace the product stacking tool 110 upwardly to move the product stacking tool 110 from the product orienting member 170 to pick the product 195 from the product orienting member 170. The product 195 is supported or lifted by the spatulas 135, 155 and retained within the product holding space 114 of the product stacking tool 110 by the product retention members 113 as the product retention members 113 apply a downward force to the product 195 to hold the product 195 against the spatulas 135, 155.

Figure 4E:
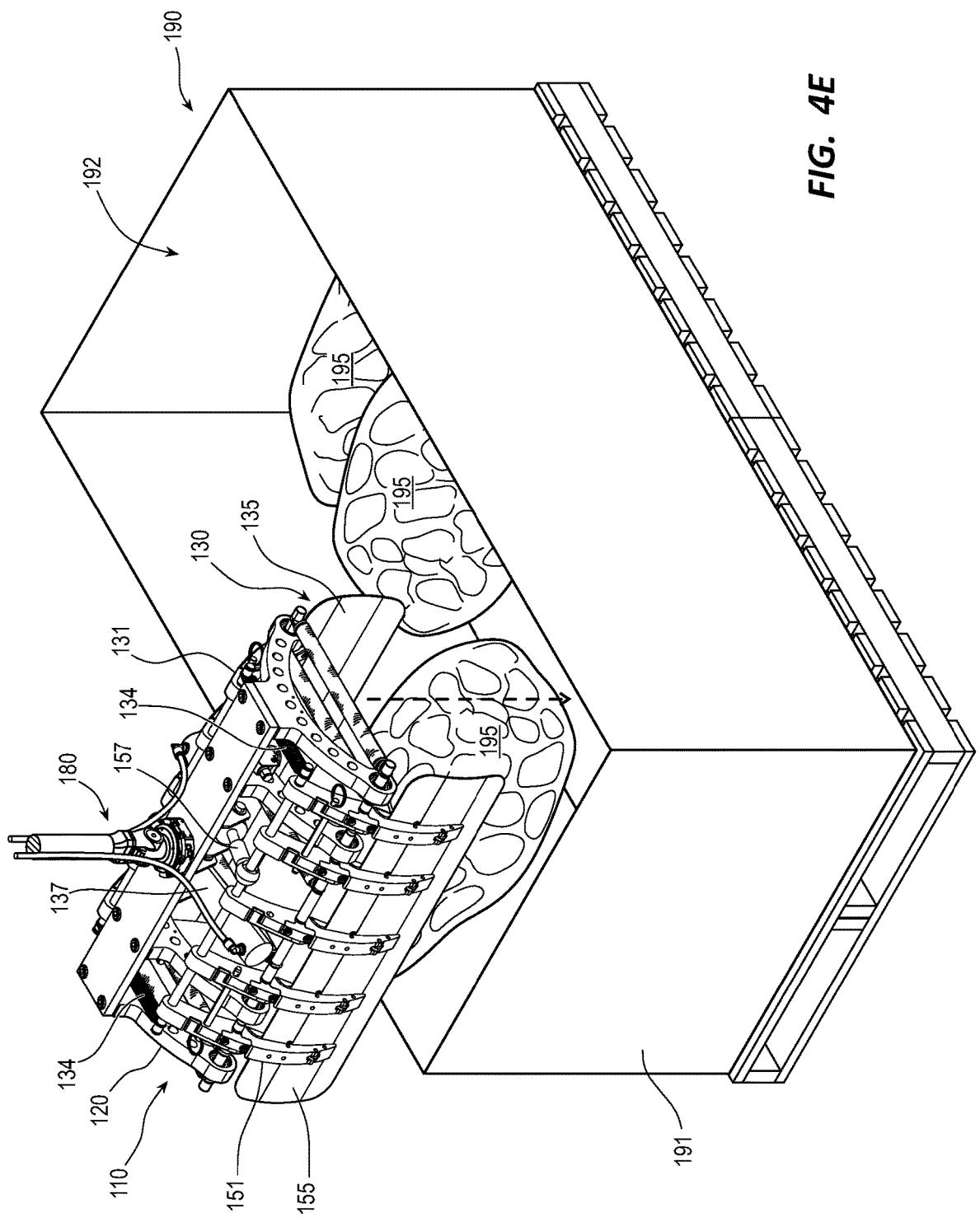
FIG. 4E is a perspective view of the product stacking tool of FIG. 1 and the product disposed over a product transport member of FIG. 1 in a product release state.

As illustrated in FIG. 4E, the robotic arm 180 can position the product stacking tool 110 and the product 195 over and/or within the product transport member 190. The actuators 137, 157 are deactivated to allow the retraction members 134 to displace the upper ends of the fingers 131, 151 inwardly, such that the fingers 131, 151 are transitioned from the angled orientation to the vertical orientation. When the fingers 131, 151 transition to the vertical orientation, the spatulas 135, 155 separate and the product 195 is released from the product stacking tool 110 and disposed in or on the product transport member 190. In the vertical orientation, the spatulas 135, 155 are disposed within vertical planes extending from the sides of the frame 120 to allow the product stacking tool 110 to be positioned adjacent or near the wall 191 of the product transport member 190 and the product 195 to be stacked adjacent or near the wall 191.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified. For example, a method of stacking a product may include one or more of the following steps: orienting the product within a product orienting member, wherein the product is axially aligned with a longitudinal axis of the product orienting member; moving a robotic end of arm stacking tool into the product orienting member, wherein a first plurality of fingers and a second plurality of fingers engage with a wall of the product orienting member; pivoting the first plurality of fingers about a first pivot axis and pivoting the second plurality of fingers about a second pivot axis, wherein a first spatula and a second spatula are displaced inwardly; sliding the first spatula and the second spatula under the product, wherein the product is disposed within the robotic end of arm stacking tool; activating a first actuator to apply an outwardly directed force to the first plurality of fingers and activating a second actuator to apply an outwardly directed force to the second plurality of fingers to retain the product within the robotic end of arm stacking tool; and moving the robotic end of arm stacking tool out of the product orienting member, wherein the product is lifted by the first spatula and the second spatula. Other steps are also contemplated.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment.

It will be appreciated that various features are sometimes grouped together in a single embodiment, figure, or description thereof for the purpose of streamlining the disclosure. Many of these features may be used alone and/or in combination with one another.

The phrase "coupled to" refers to any form of interaction between two or more entities, including mechanical, electrical, magnetic, electromagnetic, fluid, and thermal interaction. Two components may be coupled to each other even though they are not in direct contact with each other. For example, two components may be coupled to with each other through an intermediate component.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

The terms "a" and "an" can be described as one, but not limited to one. For example, although the disclosure may recite a frame having "a cross bar," the disclosure also contemplates that the frame can have two or more cross bars.

Unless otherwise stated, all ranges include both endpoints and all numbers between the endpoints.

Recitation in the claims of the term "first" with respect to a feature or element does not necessarily imply the existence of a second or additional such feature or element.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:
1. A product stacking system, comprising:
a robotic end of arm stacking tool comprising:
  a frame comprising a first side and a second side opposite of the first side and supporting a first pivot rod disposed on the first side and a second pivot rod disposed on the second side;
  a product support comprising:
    a first plurality of fingers coupled to the first pivot rod and disposed in a first vertical position;
    a first spatula coupled to the first plurality of fingers and extending downward from the first plurality of fingers, wherein the first spatula is configured to support a product;
    a first actuator supported by the frame and coupled to the first plurality of fingers, the first actuator to exert a force to maintain the first plurality of fingers in a first angled position;
    wherein the first plurality of fingers rotate in a first direction about a first rotation axis in alignment with the first pivot rod to displace the first plurality of fingers from the first vertical position toward a midline of the frame and into the first angled position;
    a second plurality of fingers coupled to the second pivot rod and disposed in a second vertical position;
    a second spatula coupled to the second plurality of fingers and extending downward from the second plurality of fingers, wherein the second spatula is configured to support the product; and a second actuator coupled to the second plurality of fingers, the second actuator to exert a force to maintain the second plurality of fingers in a second angled position;

wherein the second plurality of fingers rotate in a second direction, opposite of the first direction, about a second rotation axis in alignment with the second pivot rod to displace the second plurality of fingers from the second vertical position toward both the midline of the frame and the first plurality of fingers and into the second angled position; and a product orienting member comprising an elongate arcuate wall to engage with the first and second plurality of fingers to displace the first and second plurality of fingers from the first vertical position to the first angled position and the second vertical position to the second angled position, respectively, and to direct the first and second spatulas to slide under the product as the robotic end of arm stacking tool engages with the product orienting member at product picking.

2. The product stacking system of claim 1, wherein each of the first plurality of fingers and each of the second plurality of fingers comprise an arcuate shape configured to correspond with an arcuate shape of the product orienting member.

3. The product stacking system of claim 1, wherein each finger of the first plurality of fingers is coupled to the first pivot rod adjacent a longitudinal midpoint of the finger, and wherein each finger of the second plurality of fingers is coupled to the second pivot rod adjacent a longitudinal midpoint of the finger.

4. The product stacking system of claim 1, wherein each of the first plurality of fingers and each of the second plurality of fingers comprise a guide member configured to engage with the arcuate wall of the product orienting member.

5. The product stacking system of claim 4, wherein the guide member is selected from one of the following: a wheel, a roller, a skid, a bushing, a glide, a slide, a slope, and a skate.

6. The product stacking system of claim 1, wherein the first pivot rod and the second pivot rod are in alignment with a horizon of the arcuate wall when the robotic end of arm stacking tool is disposed within the product orienting member.

7. The product stacking system of claim 1, wherein the first spatula and the second spatula are selected from one of the following: polyoxymethylene homopolymer, polyethylene, stainless steel, and aluminum.

8. The product stacking system of claim 1, wherein the first actuator and the second actuator are selected from one of the following: a pneumatic linear actuator, a hydraulic linear actuator, an electromagnetic solenoid, a stepper motor, and a servomotor.

9. The product stacking system of claim 1, further comprising a finger retraction member coupled to the first plurality of fingers and the second plurality of fingers to displace the first plurality of fingers from the first angled position to the first vertical position and the second plurality of fingers from the second angled position to the second vertical position, wherein the finger retraction member is selected from one of the following: an extension spring, an elastomeric band, an elastomeric chord, and a gas cylinder.

10. The product stacking system of claim 1, further comprising:

a first push rod coupled to the first plurality of fingers and to the first actuator to exert the force to maintain the first plurality of fingers in the first angled position; and a second push rod coupled to the second plurality of fingers and to the second actuator to exert the force to maintain the second plurality of fingers in the second angled position.

11. The product stacking system of claim 1, further comprising a product retention member disposed between the first pivot rod and the second pivot rod to retain the product within the robotic end of arm stacking tool when the product is supported by the first and second spatulas, wherein the product retention member is selected from one of the following: a covered extension spring, an elastomeric chord, and an elastomeric band.

12. The product stacking tool of claim 1, wherein the product orienting member orients the product into axial alignment with the robotic end of arm stacking tool for product picking.

13. The product stacking system of claim 1, wherein the product orienting member further comprises:

the arcuate wall comprising an arc of less than 180 degrees;

a first vertical wall extending upward from a first side of the arcuate wall; and a second vertical wall extending upward from a second side of the arcuate wall, wherein the first and second vertical walls engage with the first and second plurality of fingers when the robotic end of arm stacking tool is received into the product orienting member.

14. The product stacking system of claim 1, further comprising a product transport member configured to receive the product as stacked by the robotic end of arm stacking tool, wherein the product transport member comprises any one of a bin and a pallet.

15. The product stacking system of claim 1, further comprising a robotic arm coupled to the robotic end of arm stacking tool to move the robotic end of arm stacking tool between a picking location at the product orienting member and a product stacking location.

16. A robotic end of arm product stacking tool, comprising:

a frame comprising a first side and a second side opposite of the first side and supporting a first pivot rod on the first side and a second pivot rod on the second side;

a product support comprising:

a first plurality of fingers coupled to the first pivot rod and disposed in a first vertical position;

a first spatula coupled to the first plurality of fingers and extending downward from the first plurality of fingers, wherein the first spatula is configured to support a product; and a first actuator supported by the frame and coupled to the first plurality of fingers, the first actuator to exert a force to maintain the first plurality of fingers in a first angled position;

wherein the first plurality of fingers rotate about a first rotation axis in alignment with the first pivot rod in a first direction to displace the first plurality of fingers from the first vertical position toward a midline of the frame and into the first angled position;

a second plurality of fingers coupled to the second pivot rod and disposed in a second vertical position;

a second spatula coupled to the second plurality of fingers and extending downward from the second plurality of fingers, wherein the second spatula is configured to support the product; and a second actuator coupled to the second plurality of fingers, the second actuator to exert a force to maintain the second plurality of fingers in a second angled position;

wherein the second plurality of fingers rotate about a second rotation axis in alignment with the second pivot rod in a second direction, opposite of the first direction, to displace the second plurality of fingers from the second vertical position toward the midline of the frame and the first plurality of fingers and into the second angled position.

17. The robotic end of arm product stacking tool of claim 16, wherein each of the first plurality of fingers and each of the second plurality of fingers comprise an arcuate shape configured to match an arcuate wall of a product orienting member.

18. The robotic end of arm product stacking tool of claim 16, wherein each of the first plurality of fingers and each of the second plurality of fingers comprise a guide member configured to engage with the arcuate wall of the product orienting member, wherein the guide member is selected from one of the following: any one of a wheel, a roller, a skid, a bushing, a glide, a slide, a slope, and a skate.

19. The robotic end of arm product stacking tool of claim 16, wherein the first pivot rod and the second pivot rod are in alignment with a horizon of the arcuate wall when the robotic end of arm stacking tool is disposed within the product orienting member.

20. The robotic end of arm product stacking tool of claim 16, wherein each finger of the first plurality of fingers is coupled to the first pivot rod adjacent a longitudinal midpoint of the finger, and wherein each finger of the second plurality of fingers is coupled to the second pivot rod adjacent a longitudinal midpoint of the finger.

21. The robotic end of arm product stacking tool of claim 16, wherein the first spatula and the second spatula are selected from one of the following: polyoxymethylene homopolymer, polyethylene, stainless steel, and aluminum.

22. The robotic end of arm product stacking tool of claim 16, wherein the first actuator and the second actuator are selected from one of the following: a pneumatic linear actuator, a hydraulic linear actuator, an electromagnetic solenoid, a stepper motor, and a servomotor.

23. The robotic end of arm product stacking tool of claim 16, further comprising a finger retraction member coupled to the first plurality of fingers and the second plurality of fingers to displace the first plurality of fingers from the first angled position to the first vertical position and the second plurality of fingers from the second angled position to the second vertical position, wherein the finger retraction member is selected from one of the following: an extension spring, an elastomeric band, an elastomeric chord, and a gas cylinder.

24. The robotic end of arm product stacking tool of claim 16, further comprising:

a first push rod coupled to the first plurality of fingers and to the first actuator to exert the force to maintain the first plurality of fingers in a first angled position; and a second push rod coupled to the second plurality of fingers and to the second actuator to exert the force to maintain the second plurality of fingers in a second angled position.

25. The robotic end of arm product stacking tool of claim 16, further comprising a product retention member disposed between the first pivot rod and the second pivot rod to retain the product within the robotic end of arm stacking tool when the product is supported by the first and second spatulas, wherein the product retention member is selected from one of the following: a covered extension spring, an elastomeric chord, and an elastomeric band.

* * * * *